Patented Oct. 16, 1951

2,571,343

UNITED STATES PATENT OFFICE 2,571,343

SELF-SETTING PLASTIC MATERIAL CONSISTING ESSENTIALLY OF ALPHA-GYPSUM AND AN AMINOTRIAZINE RESIN

Manvel C. Dailey, Elmhurst, and Edward W. Duffy, Chicago, Ill., assignors to United States Gypsum Company, Chicago, Ill., a corporation of Illinois No Drawing. Application January 25, 1945, Serial No. 574,636

6 Claims. (Cl. 260—39)

This invention relates to a composition of matter capable of being cast into dense cementitious products, and comprises a major quantity of "alpha" gypsum and a minor quantity of a water-soluble curable triazine-aldehyde condensation product, and more particularly formed articles made therefrom and containing about from 95% to 55% by weight of set alpha gypsum and from about 5% to 45% by weight of a cured triazine-aldehyde condensation product.

We have discovered that suitably proportioned blends of triazine-aldehyde resins and the particular type of calcined gypsum, known as "alpha" gypsum, as described in United States Patent No. 1,901,051, are particularly adapted for producing casts having the desirable characteristics, because castings can be produced which need not be dried in order to develop their maximum strength. Castings produced from such blends rapidly develop extraordinarily high strength and toughness, permitting rapid production of, for example, dies, templates, patterns, etc. The resin found most satisfactory for our use is the water-soluble, heat-hardenable or curable condensation product obtained by condensing formaldehyde and 2,4,6-triamino-1,3,5-triazine. Various types of these resins are adaptable for use in our compositions. Our preferred composition comprises dry mixtures of the powdered, water-soluble, heat-hardenable or curable resin and alpha gypsum, plus small amounts of a suitable catalyst to aid in curing the resin at moderate temperatures Other ingredients may be added if and as desired to control the setting time of the alpha gypsum. Resin plasticizers may also be employed, as well as fillers and reinforcing agents such as paper fiber, asbestos, wood flour, silica, clay, starch, talc, mica, hemp, sisal, glass wool, etc. Resin proportions are preferably maintained at below 45 per cent of the total composition weight. In general, the strength, hardness, and impact strength of the finished set and cured cast increases as the proportion of resin present is increased.

Accordingly, one of the objects of the present invention is to provide a dry mixture consisting essentially of a major portion of alpha gypsum and a minor portion of a curable water-soluble triazine-aldehyde condensation product, from which mixture, upon gauging with water, hard dense castings of extreme strength and toughness can be produced.

A further object is to produce dense, hard and tough castings which may be employed, if desired without the necessity of drying, to form templates, dies, forming-dies, etc., especially after the cast products have been cured, as by subjecting them to a moderate curing-temperature, say of about 150° F.

A further object of the invention is to provide a material in the form of a calcined gypsum cement having such a low consistency that it may be converted by the addition of the right amount of water chemically to combine with the calcined gypsum into a pourable slurry which will set up into an extremely dense product from which no excess water needs to be removed.

Further objects of the invention will become apparent from the further description and claims hereinbelow.

We have found that most at least colloidally water-soluble thermo-setting or thermo-plastic resins are not compatible with alpha gypsum. The triazine-aldehyde resins however possess the very desirable characteristic of decreasing the amount of water required to be mixed with the alpha gypsum to produce a mix of pourable or fluid consistency.

Accordingly, the present invention contemplates the admixture of a water-soluble curable triazine-aldehyde resin with alpha gypsum. Preferably the triazine resin is the one prepared from that particular triazine known as melamine condensed with the particular aldehyde known as formaldehyde. Ordinarily, a condensation product produced by reacting about one mol of melamine with about three or more mols of formaldehyde is suitable, but the invention is not limited to that particular form of triazine-aldehyde resin, provided only that the resin is at least colloidally water-soluble and is capable of being cured to a hard, set water-insoluble condition.

A further advantage in the use of melamine-formaldehyde resin lies in the low temperatures at which such resin may be cured. With the use of the proper catalysts, 48-hour curing at temperatures of about 90 to 100 degrees Fahrenheit is sufficient to completely set and harden the resin. Curing time is reduced as curing temperature is increased. For example, the resin will cure completely within a period of from 2 to 3 hours by exposure to about 150° F.

The acidity of the resin-alpha gypsum blends should preferably be maintained at pH of 6 or below, in order to effect the proper resin cure within a short period of time and at a relatively low temperature. The acidity control may be effected by employment of any of the common types of catalysts normally used in combination with the triazine-aldehyde resins. For example, ammonium chloride has been found to be an effective catalyst. Other acid salts, and weak acids, such as zinc sulfate, zinc chloride, aluminum sulfate, boric acid, etc., may be employed. The amount of catalyst required will vary, depending upon the final characteristics desired in the finished blend, and may vary between 1% and 25%, based on the resin-content of the blend.

Pure plaster of Paris, when mixed with water, combines chemically during its hydration with 18.6% of its weight of the water employed in making a slurry. Thus, a slurry composed of 100 parts of pure plaster of Paris and 18.6 parts water would, after setting, produce a cast composed entirely of set gypsum ($CaSO_4.2H_2O$) with no free water present. In practice it is necessary to employ a considerable excess of water for production of a workable, pourable slurry. This excess water must be removed by drying after the plaster has set in order to develop the full strength and hardness of the set cast. The strength of set plaster casts is greatly affected by the presence of free water. The dry strength of any type of set gypsum casts will average 2.5–3.0 times the strength of similar casts containing free water in amounts as low as 0.3%, based on total weight. The plaster strength is also influenced greatly by the amount of water employed in mixing. For example, the wet-strength of a pure plaster of Paris mixed to a slurry with the addition of 40 parts of water per 100 parts of plaster will average 2350 pounds per square inch compressive strength. After drying to constant weight by removal of excess free water, the dry compressive strength of this plaster will average 6300 pounds per square inch. The same plaster, mixed with 60 parts water, will have a wet-strength of approximately 1150 pounds per square inch, and a dry strength of 3000 pounds per square inch. In this particular case, a 50% increase in the amount of the mixing water employed results in a decrease of over 50% in the strength of set casts produced.

The rate at which free water may be removed from set casts comprising triazine-aldehyde plaster blends, is retarded greatly by the presence of the resin. As the resin content is increased, the drying rate under similar drying conditions is decreased. This effect may be ascribed to the formation of an impervious resin film surrounding the damp set gypsum crystals. It is obvious, therefore, that in order to produce set casts of maximum strength and density in the minimum time, the amount of mixing water should be maintained at the lowest possible level.

Patent No. 1,901,051 to Randel and Dailey, discloses a high strength calcined gypsum, together with its method of manufacture. This high strength gypsum, designated as "alpha" gypsum, is manufactured by calcination of gypsum rock in contact with steam at 17 to 20 pounds gauge pressure, followed by drying and grinding. Alpha gypsum differs from ordinary plaster of Paris in that its compressive strength will range from 5000+ pounds per square inch as cast at normal pouring consistency. Its normal pouring consistency varies from 40 to 45 c. c. Normal consistency is defined as that amount of water, in cubic centimeters or grams which, when mixed with 100 grams of dry plaster, will produce a mix of such consistency that it will just pour from a cup. The normal consistency of finely ground plaster of Paris of types other than alpha gypsum will vary from 60 c. c. upward, depending upon the method of calcination and treatment. Alpha gypsum is further differentiated from ordinary plaster of Paris or hemihydrate in the physical nature of individual crystal fragments composing the finely ground product. Its properties and methods employed in production are fully disclosed in the above mentioned patent.

Heavy mixes may be prepared from alpha gypsum with a lower proportion of mixing water, but the practical lowest limit which can be applied in the production of workable slurries is in the order of from 30 to 32 parts of water per 100 parts of alpha gypsum. If less water than this is employed in making a mix, the resulting mixture is so stiff and hard that it may not be handled by normal types of open casting or forming technique. Thus, a heavy slurry of alpha gypsum, cast at a ratio of 32 parts of water per 100 parts alpha gypsum, will, after complete setting of the alpha gypsum, still contain 10.2% of free water, based on the weight of the wet set cast, which free water must be removed by drying before the set cast will attain its complete dry strength and hardness. Alpha gypsum cannot be mixed in a practical manner with only that amount of water required to produce a cast which will be completely dry and contain no free water immediately following completion of hydration. As has been indicated above, alpha gypsum will possess the same relative ratio of wet-to-dry strength as has been indicated in connection with ordinary plaster of Paris.

We have found, however, that blends of alpha gypsum and a dry powdered triazine-aldehyde resin may be produced which are mixable with water to form a pourable slurry, but with only the amount of water required for complete hydration of the alpha gypsum present in the blend. Set casts prepared from blends of this type require no drying to remove free water for the attainment of their maximum strength and hardness. By their use, time is saved in preparation of the finished castings, as the need for drying is thus eliminated.

The elimination of drying is an absolutely new and never before attained result, of a most surprising character. It has long been the aim of manufacturers of cementitious water-setting materials to produce a cement that would form a pourable, castable slurry with only the amount of water required to effect the setting of the material, so that no water had to be dried from the product. Now, for the first time, this has been made possible. Not only is the need for drying eliminated, but the products will develop their maximum strength upon setting, because there are no interstitial spaces from which water is evaporated. The result is an extremely dense, strong and tough cast. When the resin is cured, the complete product is of a hardness and toughness hitherto absolutely unapproached in the gypsum, and in fact the cement, industries.

The mixing water ratio requirements for variously proportioned blends are shown in the following table, in which the resin was a dry, powdered melamine-formaldehyde water-soluble curable resin.

| Alpha Gypsum-Resin Proportion | | Normal Consistency (c.c. $H_2O$ per 100 gram mix) | Free $H_2O$ to be removed After Hydration of the Alpha Gypsum [1] (Per Cent Based on Wet Weight of Set Cast) |
|---|---|---|---|
| Per Cent Alpha Gypsum | Per Cent Melamine Resin | | |
| 100 | 0 | 40 | 15.5 |
| 95 | 5 | 34 | 12.4 |
| 85 | 15 | 21 | 4.6 |
| 75 | 25 | 15 | 1.1 |
| 65 | 35 | 13 | 1.06 |
| 50 | 50 | 15 | 5.1 |
| 25 | 75 | 20 | 12.8 |
| 0 | 100 | 22 | 18.0 |

[1] Calculated on basis of 98 per cent $CaSO_4.\frac{1}{2}H_2O$.

It will be observed that alpha gypsum-melamine resin blends, with a resin content ranging from approximately 20% to 35%, may readily be prepared which can be cast as liquid slurries containing little or no free water which would require removal after the hydration of the alpha gypsum content is complete. Slurries may be readily mixed and handled at mixing-water ratios averaging 1 to 3 c. c. below the normal consistency. Preferably our finished compositions are prepared with resin contents that vary within the range of 15% to 35% of resin, although greater or lesser amounts of resin may be employed for specific compositions for special uses. In other words, the solutions of the melamine resins are better than plain water in wetting the alpha gypsum, and hence so little solution may be used that its water content can practically all be used up in hydrating the alpha gypsum, requiring practically nothing to be removed by drying.

The following table illustrates the physical characteristics of set casts prepared from normal plaster of Paris, alpha gypsum, plaster of Paris plus 25% melamine-aldehyde resin, and alpha gypsum plus 25% of mixed resin. The values given were determined on all mixes as cast at their normal consistencies.

The resin blends were compounded with the addition of 0.25% of ammonium chloride, added as a catalyst, to aid in the cure of the resin, and sufficient potassium sulfate (0.2%) added as a set-accelerator to produce a plaster setting time of 20 to 25 minutes. After setting, the resin blend casts were cured for 16 hours at 140 degrees F., to complete the cure of the resin.

can result by using a lower proportion of resin with alpha gypsum where maximum strength, hardness and toughness are not a requisite, as the cost of alpha gypsum is low in comparison with cost of the resins.

Due to lower mixing-water requirements with alpha gypsum-melamine resin blends, the curing shrinkage of such blends is lower than with blends of plaster of Paris-melamine resins containing equivalent amounts of resin. High curing shrinkage establishes internal stresses within the set material and permits a lower degree of dimensional accuracy in production of such casts. It is therefore desirable in any basic type composition of this sort to maintain the curing shrinkage at as low a value as possible.

Normally we employ small proportions of any of the well known resin catalysts to aid in curing of the resin constituents of the mix. Typical of such catalysts are ammonium chloride, zinc sulfate, aluminum sulfate, boric acid, and other weak acid or acid reacting salts. Use of catalysts is not essential if a slow resin cure is permissible.

Resin plasticizers such as glycerols, glycols, etc., may be employed to impart special characteristics. Setting time control of the mix may be achieved by the addition of accelerators or retarders, known in the art as effective for controlling the setting time of calcined gypsum mixtures, such as alpha gypsum. Typical setting time accelerators include potassium sulfate, finely ground raw gypsum, aluminum sulfate, sodium chloride, etc. Retarders include soluble citrates, phosphates, acetates, or other organic

|  | Ordinary Plaster of Paris | | Alpha Gypsum | |
| --- | --- | --- | --- | --- |
|  | Neat | 25 Per Cent Melamine | Neat | 25 Per Cent Melamine |
| Normal Consistency (c. c.) | 63 | 27 | 40 | 15 |
| Density (Lbs./Cu. Ft.): |  |  |  |  |
| As Cast | 100 | 110.5 | 110.0 | 115.5 |
| After Drying and Curing | 73.6 | 98.5 | 91.2 | 113.5 |
| Linear Setting Expansion (Per Cent) | 0.20 | 0.15 | 0.25 | 0.16 |
| Linear Curing Shrinkage (Per Cent) | 0.02 | 0.26 | 0.02 | 0.14 |
| Compressive Strength (Lbs./Sq. In.) | 2,400 | 6,800 | 6,500 | 14,800 |
| Surface Hardness (Brinell) | 3 | 14 | 12 | 23 |
| Modulus of Elasticity (Lbs./Sq. In.) | $1.14 \times 10^6$ | $1.24 \times 10^6$ | $2.37 \times 10^6$ | $1.80 \times 10^6$ |
| Modulus of Rupture (Lbs./Sq. In.) | 800 | 2,380 | 1,366 | 3,250 |
| Impact Strength Gram-Centimeters | 2,030 | 3,360 | 2,610 | 6,100 |

In the above table, linear setting expansion is expressed as per cent maximum expansion obtained during setting of the hemihydrate and alpha gypsum respectively. Linear curing shrinkage is expressed as per cent shrinkage measured from point of maximum setting expansion to final stable dimension obtained after complete curing and shrinkage of the specimen. Modulus of elasticity and modulus of rupture were determined on transverse strength test bars. Impact strength was determined by dropping a steel ball from increasing increments of height to the center of a 3" x 5" x 3/8" slab of the test material, said slab being mounted on a solid bed of dry sand. Impact strength is expressed as gram-centimeters, i. e., the weight in grams of the steel ball multiplied by centimeters drop required to cause fracture of the specimen.

Besides the great advantage of practical elimination of drying, there are other advantages accruing from the present invention. For example, blends containing as low as 5% of resin and 95% of alpha gypsum possess greater strength, surface hardness and toughness than blends of ordinary plaster of Paris containing as high as 25% to 30% of the resin. Considerable cost savings retarders. Setting expansion may be controlled by use of soluble potassium salts, such for example as potassium sulfate, sodium potassium tartrate, etc. Inert fillers, reinforcing fibrous materials, plasticizers, and modifications and variations thereof are considered also as part of our disclosure. Such fillers and fibrous materials include fine silica, talc, mica, asbestos fiber, glass wool, mineral wool, wood fiber, wood flour, excelsior, etc. The compositions may be colored integrally by incorporation of pigments or dyes.

The triazine-aldehyde resins which are employed for the purposes of present invention are of the type now commercially obtainable and of the kind, for example, fully described in the patents of William F. Talbot No. 2,260,239, granted October 21, 1941, and Widmer and Fisch, No. 2,310,004, granted February 2, 1943, these being resins produced by the reaction of aldehydes and triazines.

However, if the above resins are not readily available, a satisfacotry resin for the present purposes may be prepared as follows:

126 parts of melamine (1 mol) are mixed with 300 parts of 37% formalin (4 mols). The formaldehyde is preferably first brought to an alkalinity corresponding to a pH of 8.84 by the addition of 2.7 parts of a 3% aqueous solution of sodium hydroxide. The mixture of melamine and alkalinized formaldehyde are preferably heated under a reflux condenser for about 15 minutes, whereafter the condenser is changed so as to operate as a distillation condenser. It will be found that condensation of distillate commences at about 92° C. Heating is continued for about 15 minutes at the end of which time about 126 parts of a distillate will have been collected, and the temperature of the batch, as measured by a thermometer immersed therein, is about 105° C. Thereafter the operation is interrupted and the batch cooled to about 60° C. as rapidly as possible. Under those conditions there will form a clear slightly viscous oily-appearing syrup having a pH of about 8.1.

For instance, using the above mentioned resin, one may proceed as follows:

| | Parts by weight |
|---|---|
| Water | 21 |
| Syrup as above obtained | 75 |
| Alpha gypsum | 150 |
| Ammonium chloride | 1 |
| Potassium sulfate | 0.5 |
| Terra alba ($CaSO_4.2H_2O$) | 0.5 |
| Sodium citrate | 0.02 |

Such a mixture may be cast and then allowed to set. The product may then be cured at a moderately elevated temperature, say at about 150° F.

In the above mixture the ammonium chloride acts as a catalyst to accelerate the cure of the melamine resin; while the potassium sulfate, calcium sulfate dihydrate, and sodium citrate provide suitable setting expansion control and stabilization of the initial setting time of the alpha gypsum content; it being desirable to have a setting time of about fifteen to twenty minutes.

Inasmuch as the triazine-aldehyde condensation products are soluble in mixtures of alcohol and water, a still further reduction in the amount of water introduced into the gauged mixtures can be attained by the expedient of substituting alcohol for some, say up to 50%, of the water used for gauging the mixture. Any water-miscible lower aliphatic alcohol may be used for this purpose, such, for example, as methyl alcohol, ethyl alcohol, propyl and iso-propyl alcohol, etc. Of course only the water contained in such a mixture will hydrate the calcined gypsum, and the alcohol will eventually evaporate.

In use, the compositions of the present invention, where dry resins are used, are mixed with the amount of water required to produce a workable slurry, followed by casting or forming of such slurry in suitable molds. After the material has set, the set casts are cured at a moderately elevated temperature, until further condensation and insolubilization of the resin is attained. The time required for curing is a function of the temperature, proportion of catalyst employed in the composition, and type of catalyst. Four to five hours exposure at a temperature of 125 to 140° F. will effect complete curing. At lower temperatures, longer times are required. The resin will cure completely at normal temperatures of 60 to 70 degrees Fahrenheit, if sufficient time is permitted to effect the cure. Higher temperatures, of course, speed up the curing time. The heat of hydration of the alpha gypsum may be depended upon to effect, at least in part, the curing of the resin. Such temperature, by reason of the lower water content, obviously will be higher than with wetter materials.

Cost savings may be effected in the production of solid molds requiring merely toughened surfaces by production of a shell of the alpha gypsum-resin blend, such shell being backed up by a greater thickness of ordinary plaster of Paris, alpha gypsum or other cement, or by a solid mold. The back-up plaster or cement may be placed either before or after setting and curing of the alpha gypsum-resin blend composition.

The compositions as herein disclosed are particularly useful in the preparation of foundry patterns, die models, and as stretch and press dies designed for forming of light sheet metal, plywood, resin-impregnated plywood, etc. The product is particularly adaptable in production of die machine duplicator models. It also forms an excellent dental stone for use in the production of models employed in the formation of dentures and oral reproductions. It is, in fact, adapted for all types of uses requiring the production of dimensionally accurate, hard, strong, dense, tough molds or models of all types and sizes.

Slurries of alpha gypsum-melamine resin blends are also highly valuable for use as adhesives by virtue of the fact that glue bodies containing a minimum amount of water can be formed from them. Such slurries flow easily, have strong adhesive qualities, do not shrink appreciably on drying, and dry rapidly due to low free water content of the glue. They may even be so formulated as to require no drying at all. They are particularly adaptable for high speed production of plywood from wood veneers, etc.

A mixture having the following composition forms the preferred embodiment of the present invention:

| | Parts by weight |
|---|---|
| Alpha gypsum | 75 |
| Dry melamine-formaldehyde resin | 25 |
| Ammonium chloride | 0.5 |
| Terra alba ($CaSO_4.2H_2O$) | 0.5 |
| Potassium sulfate | 0.3 |
| Sodium citrate | 0.015 |

Detailed instructions for use of the above composition are as follows:

*Mixing.*—Weigh the mixture of alpha gypsum and resin, and the water, to obtain accurate and consistent results. A recommended mix is 100 parts of the powdered mixture to 16–17 parts of water by weight. For greater strength and hardness, and where a heavy mix can be used, reduce the mixing water to 13–14. The mixture does not require soaking. It should be added to the water and immediately mixed, preferably with a confectioner's wire whip. As mixing is started it will appear that there is insufficient water but a workable mix quickly develops. The mixed material is viscous and syrupy. As the mix is applied to the model or mold, either vibrate or force the mix into the detail with a short bristle brush to insure good reproduction and avoid entrapped air, or cast under vacuum.

The mixture, on setting up, develops strength in two stages. When mixed it retains its syrupy consistency for 10 to 15 minutes. Then follows a 20 to 30 minute hardening period, during which sufficient strength is developed from the setting action of the alpha gypsum to permit separation (see parting directions below) from the mold or model. The material heats and expands slightly during the hardening period. Separation is easier if made during this period of maximum heat and expansion.

*Curing.*—The above-mentioned initial hardening or set is followed by a curing period. The curing varies with the size of the cast and curing temperatures. At 75° to 95° F. (normal room conditions), casts will usually attain full strength and cure in 3 to 4 days. Cure may be completed in 8 to 16 hours (depending on the size of the cast) by exposure to temperatures of from 125° to 150° F. Working face or critical surface of casts should be uniformly exposed during cure to develop uniform hardness and toughness. Rapid surface cure may be obtained by exposure to 250 watt radiant reflective type drying lamps spaced 15 to 30 inches from the surfaces of the product.

*Parting.*—The material of the present invention can be formed against models or molds of plaster, rubber, wood, "Korogel," metal or clay. Plaster metal or wood molds should be "parted" with a thin coating of a standard stearic acid-kerosene parting composition (¼ pound of stearic acid to 1 pint of kerosene).

*Drying.*—Usually the cast material will be dry when the cure is completed. Large casts may require additional drying time if thin slurries are employed. Of course, when only enough water is used to combine with the alpha gypsum, then no drying will be required. This does not, however, obviate the necessity for curing the resin.

The present invention is not to be confused with cast resins which contain a small amount of inert fillers such as various forms of powdered minerals, as it has been proposed to employ powdered natural gypsum as a filler in synthetic resin compositions. In such resin compositions however the gypsum does not play the role of a cement, and the products cannot be characterized as being a set calcium sulfate dihydrate product. In the present instance, the alpha gypsum of the composition first becomes hydrated and sets up into a solid mass within the interstices of which, however, and surrounding the crystals of calcium sulfate dihydrate thus formed, there is the as yet uncured water solution of the resin. Under the influence of the accelerator, for example, the ammonium chloride, the resin gradually sets to form a water-insoluble and water-resistant solid, which thus forms a product which is resistant to water and has a far greater degree of hardness, strength and toughness than would the gypsum if the resin were absent.

We are aware of the fact that it has been suggested in the past to mix various types of urea-aldehyde resins, and particularly the condensation product of urea and formaldehyde known as dimethylol urea, with calcined gypsum, and to cast the mixture into various forms. It was found, however, that such mixtures of urea-formaldehyde resins and gypsum required much greater amounts of water to produce pourable slurries, were very deficient in strength, had considerable shrinkage during their drying, and were not properly water-resistant. Moreover, in the case of the urea-aldehyde resins, this interferred with the proper setting of the mix, and even after the mix was set it was found difficult to cure the resins except at temperatures which were so high as to injure the plaster, by the fact that they would partially dehydrate the same again to the hemihydrate stage. Furthermore, urea-aldehyde resins have a proclivity for migrating to the surface of the castings, producing a sort of case-hardened skin on the product while leaving the interior soft, open, and porous, the result being casts which have a non-uniform strength and hardness and are very much inclined to crack of their own accord. It seems that there is some particular property about triazine-aldehyde condensation products, and particularly melamine-formaldehyde condensation products, which makes them entirely compatible with alpha gypsum.

By the aid of the present invention, therefore, it is possible to produce uniformly hard, dense and tough castings which require only a comparatively small amount of drying, or even no drying at all, and which are far superior to castings made with ordinary plaster of Paris or stucco compositions. The particular methods of molding are of course entirely a matter of choice and moreover are well known to all those familiar with gypsum casting techniques and therefore require no particular description or illustration.

Accordingly applicants claim:

1. Process of producing a dense, tough cast product which comprises producing a pourable slurry by gauging a mixture of a water-soluble potentially insolubilizable aminotriazine-aldehyde condensation product and alpha gypsum hemihydrate with only substantially sufficient water to hydrate the said gypsum hemihydrate, casting said pourable slurry into shape, and insolubilizing said condensation product.

2. Process of producing a dense, tough cast product which comprises producing a pourable slurry by gauging a mixture of a water-soluble potentially insolubilizable melamine-formaldehyde condensation product and alpha gypsum hemihydrate with only substantially sufficient water to hydrate the said gypsum hemihydrate, casting said pourable slurry into shape, and insolubilizing said condensation product.

3. A dense and strong gypsum article consisting essentially of about 80% to 75% by weight of set alpha gypsum and 20% to 25% by weight of a water-insoluble aminotriazine-aldehyde condensation product, said article having a density of about 113.5 pounds per cubic foot, a compressive strength of about 14,800 pounds per square inch, and a modulus of rupture of about 3,250 pounds per square inch.

4. A dense and strong gypsum article consisting esentially of about 80% to 75% by weight of set alpha gypsum and 20% to 25% by weight of a water-insoluble melamine-formaldehyde condensation product, said article having a density of about 113.5 pounds per cubic foot, a compressive strength of about 14,800 pounds per square inch, and a modulus of rupture of about 3,250 pounds per square inch.

5. A composition comprising unset alpha gypsum hemihydrate and a water-soluble aminotriazine-aldehyde condensation product capable of being converted to the water-insoluble condition, said composition being convertible into a pourable slurry that is capable of setting to a dense and strong casting upon admixture with an amount of water not exceeding the stoichiometrical amount required to hydrate said alpha gypsum hemihydrate; the relative proportions of alpha gypsum hemihydrate and aminotriazine-aldehyde condensation product lying within the range of from 80% to 75% by weight of the alpha gypsum hemihydrate and 20% to 25% of the said condensation product, said composition also containing a water-soluble acid-reacting catalyst for the conversion of said condensation product to the water-insoluble condition.

6. A composition comprising unset alpha gypsum hemihydrate and a water-soluble melamine-formaldehyre condensation product capable of being converted to the water-insoluble condition, said composition being convertible into a pourable slurry capable of setting to a dense and strong casting upon admixture with an amount of water not exceeding the stoichiometrical amount required to hydrate said alpha gypsum hemihydrate; the relative proportions of alpha gypsum hemihydrate and melamine-formaldehyde condensation product lying within the range of from 80% to 75% by weight of the alpha gypsum hemihydrate and 20% to 25% of the said condensation product, said composition also containing a water-soluble acid-reacting catalyst for the conversion of said condensation product to the water-insoluble condition.

MANVEL C. DAILEY.
EDWARD W. DUFFY.

REFERENCES CITED

The following references are of record in the file of this patent:

UNITED STATES PATENTS

| Number | Name | Date |
|---|---|---|
| 1,901,051 | Randel et al. | Mar. 14, 1933 |
| 2,152,670 | Shutt | Apr. 4, 1939 |
| 2,209,292 | Berger | July 23, 1940 |
| 2,240,529 | Tyce et al. | May 6, 1941 |
| 2,318,121 | Widmer et al. | May 4, 1943 |
| 2,332,235 | Kistler | Oct. 19, 1943 |
| 2,346,999 | Sanford et al. | Apr. 18, 1944 |
| 2,419,440 | Delmonte | Apr. 22, 1947 |